United States Patent
Kosugi

(10) Patent No.: US 11,956,640 B2
(45) Date of Patent: Apr. 9, 2024

(54) COMMUNICATION DEVICE

(71) Applicant: KABUSHIKI KAISHA TOKAI RIKA DENKI SEISAKUSHO, Aichi (JP)

(72) Inventor: Masanori Kosugi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 73 days.

(21) Appl. No.: 17/851,411

(22) Filed: Jun. 28, 2022

(65) Prior Publication Data

US 2023/0062736 A1    Mar. 2, 2023

(30) Foreign Application Priority Data

Aug. 25, 2021   (JP) .................... 2021-136798

(51) Int. Cl.
| | |
|---|---|
| *H04B 1/16* | (2006.01) |
| *H04B 1/034* | (2006.01) |
| *H04B 1/04* | (2006.01) |
| *H04B 1/08* | (2006.01) |
| *H04B 5/22* | (2024.01) |
| *H04W 12/06* | (2021.01) |
| *H04W 12/63* | (2021.01) |

(Continued)

(52) U.S. Cl.
CPC ............ *H04W 12/71* (2021.01); *H04B 1/034* (2013.01); *H04B 1/04* (2013.01); *H04B 1/086* (2013.01); *H04B 5/22* (2024.01); *H04W 12/63* (2021.01); *H04W 64/00* (2013.01)

(58) Field of Classification Search
CPC ..... H04W 12/71; H04W 12/63; H04W 64/00; H04W 64/006; H04W 12/06; H04B 1/034; H04B 1/04; H04B 5/0012; H04B 1/16; H04B 1/40; H04M 1/72412
See application file for complete search history.

(56) References Cited

U.S. PATENT DOCUMENTS

2012/0329524 A1* 12/2012 Kent .................... G06F 3/0443
                                                    455/566
2013/0300618 A1* 11/2013 Yarga .................... H01Q 1/243
                                                    343/720

(Continued)

FOREIGN PATENT DOCUMENTS

JP          11-208419 A      8/1999

*Primary Examiner* — Andrew Wendell
(74) *Attorney, Agent, or Firm* — GREENBLUM & BERNSTEIN, P.L.C.

(57) ABSTRACT

There is provided a communication device comprising: a wireless communication circuit configured to control wireless communication with a portable device in conformity with a specific communication standard; a capacitive sensor circuit configured to detect proximity of an object on a basis of a change in capacitance; an antenna configured to be used for both transmitting/receiving a wireless signal conforming to the specific communication and detecting the capacitance; a high-pass filter disposed between the wireless communication circuit and the antenna; and a low-pass filter disposed between the capacitive sensor circuit and the antenna, wherein the communication device is configured to be disposed in a gripping portion to be gripped by a user carrying the portable device.

9 Claims, 4 Drawing Sheets

(51) Int. Cl.
*H04W 12/71* (2021.01)
*H04W 64/00* (2009.01)

(56) References Cited

U.S. PATENT DOCUMENTS

| | | | |
|---|---|---|---|
| 2014/0087786 A1* | 3/2014 | Tani | G06F 3/044 455/556.1 |
| 2019/0383927 A1* | 12/2019 | Mihajlovic | G01S 7/03 |
| 2022/0239355 A1* | 7/2022 | Katz | H04B 5/72 |

* cited by examiner

COMMUNICATION DEVICE

CROSS REFERENCE TO RELATED APPLICATION(S)

This application is based upon and claims benefit of priority from Japanese Patent Application No. 2021-136798, filed on Aug. 25, 2021, the entire contents of which are incorporated herein by reference.

BACKGROUND

The present invention relates to a communication device.

In recent years, technologies of performing authentication on the basis of wireless signals transmitted and received between devices have been developed. For example, JP H11-208419A discloses a system that authenticates a portable device on the basis of wireless signals transmitted and received between a vehicle-mounted device and the portable device. The system unlocks doors of a vehicle in the case where the authenticity of the portable device is confirmed.

SUMMARY

To further improve security of such a system, it is also assumed that a capacitive sensor detects proximity of a hand of a user and this triggers unlocking the doors, for example.

However, in the case where both the capacitive sensor and a structural element for achieving wireless communication are embedded in a single housing, this may limit a physical space.

Accordingly, the present invention is made in view of the aforementioned issue, and an object of the present invention is to achieve a smaller device that performs wireless communication and detects proximity of an object.

To solve the above-described difficulty, according to an aspect of the present invention, there is provided a communication device comprising: a wireless communication circuit configured to control wireless communication with a portable device in conformity with a specific communication standard; a capacitive sensor circuit configured to detect proximity of an object on a basis of a change in capacitance; an antenna configured to be used for both transmitting/receiving a wireless signal conforming to the specific communication standard and detecting the capacitance; a high-pass filter disposed between the wireless communication circuit and the antenna; and a low-pass filter disposed between the capacitive sensor circuit and the antenna, wherein the communication device is configured to be disposed in a gripping portion to be gripped by a user carrying the portable device.

As described above, according to the present invention, it is possible to achieve a smaller device that performs wireless communication and detects proximity of an object.

DETAILED DESCRIPTION OF THE EMBODIMENT(S)

Figure 1:
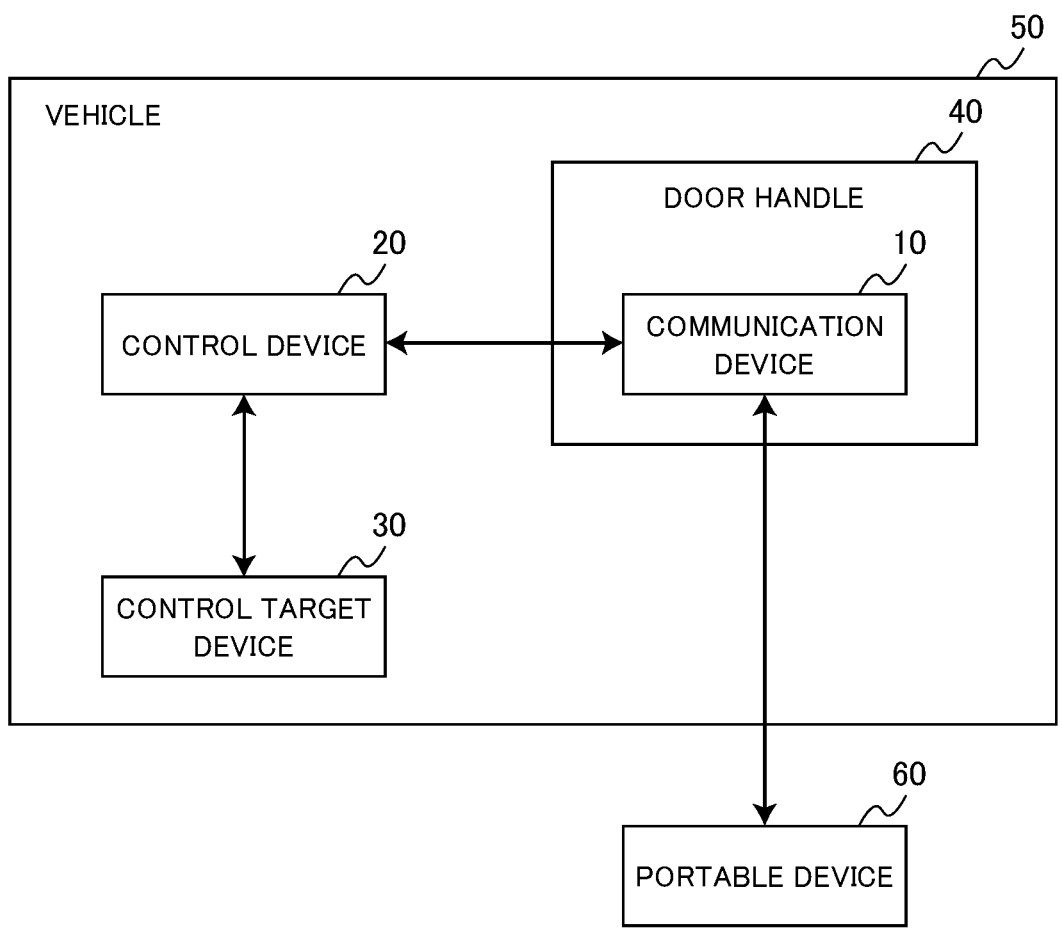
FIG. 1 is a block diagram illustrating a configuration example of a communication system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

1.1. System Configuration Example

First, a configuration example of a communication system 1 according to an embodiment of the present invention will be described. FIG. 1 is a block diagram illustrating the configuration example of the communication system 1 according to the embodiment of the present invention.

As shown in FIG. 1, the communication system 1 according to the present embodiment includes a communication device 10, a control device 20, and a control target device 30, which are installed in a vehicle 50.

The communication system 1 according to the present embodiment further includes a portable device 60 that is carried by a user of the vehicle 50. The user of the vehicle 50 includes, for example, an owner of the vehicle 50, a person authorized by the owner to use the vehicle 50, and the like.

(Communication Device 10)

The communication device 10 according to the present embodiment is disposed in a gripping portion provided on an exterior of the vehicle 50.

The gripping portion may be various structural elements to be gripped by the user carrying the portable device 60.

A door handle 40 according to the present embodiment is an example of the gripping portion.

The communication device 10 according to the present embodiment performs wireless communication with the portable device 60 in conformity with a specific communication standard.

In addition, the communication device 10 according to the present embodiment detects a hand or the like of the user that is adjacent to or in contact with the door handle 40.

A detailed configuration example of the communication device 10 according to the present embodiment will be described later.

(Control Device 20)

The control device 20 according to the present embodiment authenticates the portable device 60 on the basis of the wireless communication between the communication device 10 and the portable device 60 in conformity with the specific communication standard.

In addition, the control device 20 according to the present embodiment controls operation of the control target device 30 installed in the vehicle 50 on the basis of a result of the authentication of portable device 60 and a result of the proximity detection of an object performed by the communication device 10.

(Control Target Device 30)

The control target device 30 according to the present embodiment is various devices that are installed in the vehicle 50 and that perform some sort of operation under the control of the control device 20.

Examples of the control target device 30 according to the present embodiment include a locking device that locks and unlocks doors of the vehicle 50, for example.

The control device 20 according to the present embodiment may cause the locking device to unlock the doors in the case where authenticity of the portable device 60 is confirmed through the authentication and proximity of the object is detected by the communication device 10, for example.

With the above-described control, the doors of vehicle 50 can be unlocked in the case where the door handle 40 is in contact with the user carrying the authenticated portable device 60, whereby it is expected to improve security.

The configuration example of the communication system 1 according to the present embodiment has been described above. Note that, the configuration described above with reference to FIG. 1 is a mere example. The configuration of the communication system 1 according to the present embodiment is not limited thereto.

The configuration of the communication system 1 according to the present embodiment may be flexibly modified in accordance with specifications and operations.

1.2. Configuration Example of Communication Device 10

Next, a configuration example of the communication device 10 according to the present embodiment will be described.

Figure 2:
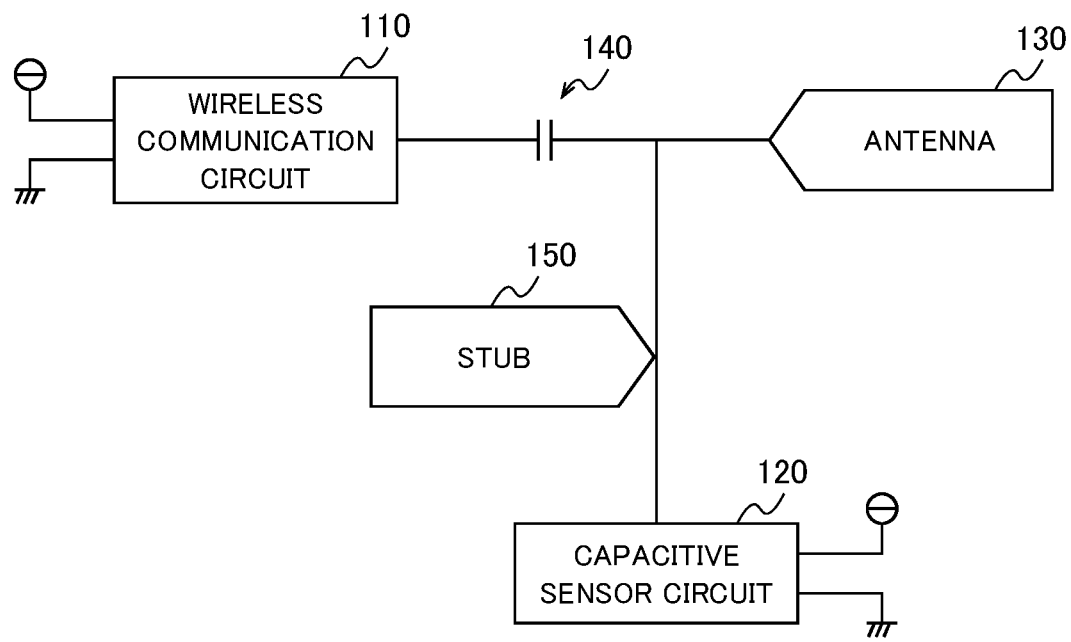
FIG. 2 is a block diagram illustrating a configuration example of a communication device 10 according to the embodiment.

FIG. 2 is a block diagram illustrating the configuration example of the communication device 10 according to the present embodiment.

As shown in FIG. 2, the communication device 10 according to the present embodiment includes a wireless communication circuit 110 configured to control wireless communication with the portable device 60 in conformity with the specific communication standard, a capacitive sensor circuit 120 configured to detect proximity of an object on the basis of a change in capacitance, and an antenna 130.

The specific communication standard according to the present embodiment may be a standard for transmitting/receiving wireless signals in a very high frequency (VHF) band or higher frequency bands, for example.

More specifically, the specific communication standard according to the present embodiment may be a standard for transmitting/receiving wireless signals in an ultra-wide band (UWB).

Both the wireless communication circuit 110 and the capacitive sensor circuit 120 are generally formed on a flat board and require a space of a specified size or larger for placement.

Therefore, it may be difficult to provide a sufficient space for placing the wireless communication circuit 110 and the capacitive sensor circuit 120 in a structural element configured to be gripped by the user such as the door handle 40, for example.

The technical idea according to the embodiment of the present invention was conceived by focusing on the above-described points, and makes it possible to downsize the communication device 10 and to solve the space limitation as described above, by using the antenna 130 for both transmitting/receiving wireless signals conforming to the specific communication standard and detecting capacitance.

Therefore, the antenna 130 according to the present embodiment includes an electrode used to detect capacitance, in addition to a structural element for transmitting/receiving wireless signals conforming to the specific communication standard.

However, in the case where the antenna 130 is simply used for both transmitting/receiving wireless signals conforming to the specific communication standard and detecting capacitance, it is assumed that operation of the wireless communication circuit 110 and operation of the capacitive sensor circuit 120 may affect each other.

Specifically, it is desirable to separate alternating current (AC) signals from direct current (DC) signals, since the AC signals are used in the wireless communication conforming to the specific communication standard, while the DC signals are used for detecting capacitance.

Therefore, the communication device 10 according to the present embodiment includes a high-pass filter disposed between the wireless communication circuit 110 and the antenna 130 and between the wireless communication circuit 110 and the capacitive sensor circuit 120.

The high-pass filter according to the present embodiment may be a capacitor 140, for example.

When using the high-pass filter such as the capacitor 140, it is possible to prevent the DC signals from flowing into the wireless communication circuit 110 and to prevent the capacitance detection from affecting the wireless communication circuit 110.

The communication device 10 according to the present embodiment further includes a low-pass filter disposed between the capacitive sensor circuit 120 and the antenna 130 and between the wireless communication circuit 110 and the capacitive sensor circuit 120.

The low-pass filter according to the present embodiment may be a stub 150 or a trap circuit, for example.

Figure 3:
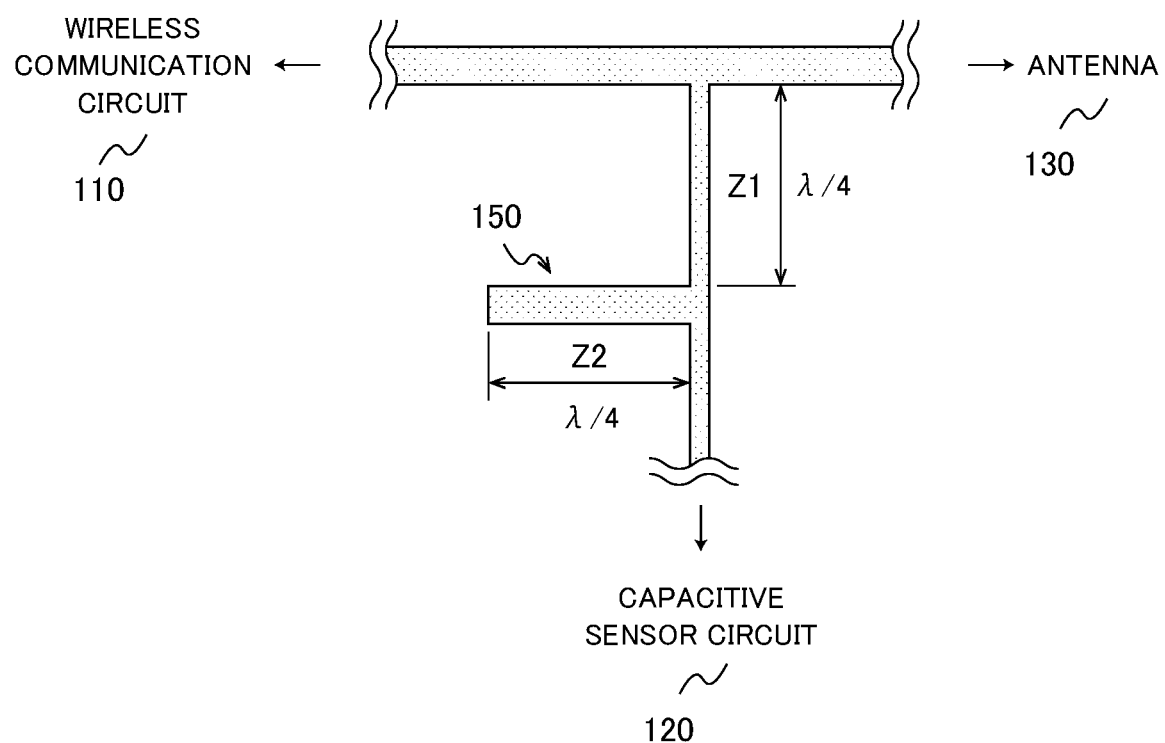
FIG. 3 is a diagram explaining a configuration example of a stub 150 according to the embodiment.

FIG. 3 is a diagram explaining a configuration example of the stub 150 according to the present embodiment.

As shown in FIG. 3, the stub 150 according to the present embodiment is interposed between the antenna 130 and the capacitive sensor circuit 120 on a transmission that is branched off from a transmission line connecting the antenna 130 and the wireless communication circuit 110.

In this case, a length Z1 from the transmission line connecting the antenna 130 and the wireless communication circuit 110 to the stub 150 is determined on the basis of a wireless signal conforming to the specific communication standard.

A length Z2 of the stub 150 in a longitudinal direction is also determined on the basis of the wireless signal conforming to the specific communication standard.

The stub 150 according to the present embodiment may be formed in such a manner that both the length Z1 and the length Z2 are $\lambda/4$, for example. Here, $\lambda$ represents a wavelength of the frequency used for the wireless communication conforming to the specific communication standard.

With the stub 150 satisfying the above-described conditions, it is possible to cancel out high frequency AC signals and to prevent the AC signals from flowing into the capacitive sensor circuit 120.

The configuration example of the communication device 10 according to the present embodiment has been described above. With the above-described configuration, the wireless communication and the capacitance detection can be performed in parallel without affecting each other.

Note that, the configuration described above with reference to FIG. 2 is a mere example. The configuration of the communication device 10 according to the present embodiment is not limited thereto.

The configuration of the communication device 10 according to the present embodiment may be flexibly modified in accordance with specifications and operations.

1.3. Example of Flow of Operation

Next, an example of a flow of operation of the communication system 1 according to the present embodiment will be described.

As described above, the control by the wireless communication circuit 110 over the wireless communication conforming to the specific communication standard and the proximity detection of an object by the capacitive sensor circuit 120 can be performed in parallel.

On the other hand, the capacitive sensor circuit 120 may detect the proximity of the object after the authenticity of the portable device is confirmed on the basis of the wireless communication conforming to the specific communication standard.

In this case, by controlling ON/OFF of the wireless communication circuit 110 and the capacitive sensor circuit 120 on the basis of a sequence of processes, it is expected to obtain an effect of reducing power consumption.

A flow of operation will be described below with reference to FIG. 4, in the case where the capacitive sensor circuit 120 detects proximity of an object after the authenticity of the portable device 60 is confirmed on the basis of the wireless communication conforming to the specific communication standard.

Figure 4:
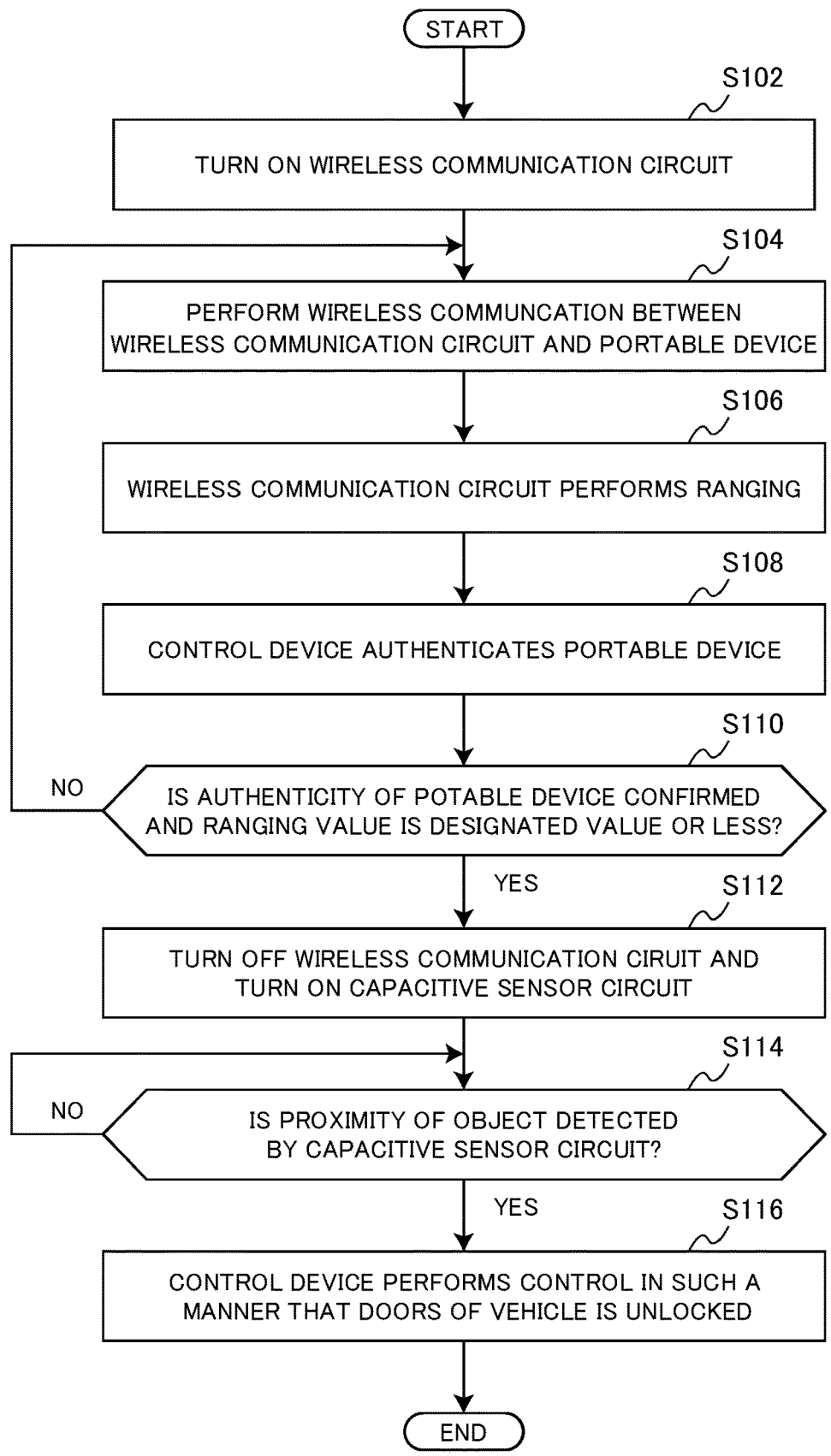
FIG. 4 is a flowchart illustrating an example of controlling in the case where a capacitive sensor circuit 120 detects proximity of an object after the authenticity of a portable device 60 is confirmed on the basis of the wireless communication conforming to a specific communication standard.

Note that, FIG. 4 illustrates a major example in which the specific communication standard according to the present embodiment is the standard for transmitting/receiving wireless signals in the UWB.

In the case of the example shown in FIG. 4, first, the control device 20 turns on the wireless communication circuit 110 (S102).

Next, the wireless communication circuit 110 performs the wireless communication with the portable device 60 (S104).

Next, the wireless communication circuit 110 performs ranging (S106) on the basis of signals transmitted and received in step S104. The ranging is a process to estimate a distance between the wireless communication circuit 110 and the portable device 60.

Note that the ranging in step S106 may not necessarily be performed depending on a communication standard to be used.

Next, the control device 20 authenticates the portable device 60 (S108) on the basis of the signals transmitted and received by the wireless communication circuit 110 in step S104.

To implement the authentication in step S108, the wireless communication circuit 110 may transmit a signal that requests information certifying the authenticity of the portable device 60 to the portable device 60 and may receive a signal including the information from the portable device 60.

On the other hand, the above-described signals used for authenticating the portable device 60 may be transmitted/received through wireless communication conforming to another communication standard different from the specific communication standard.

The other standard described above includes a standard for transmitting/receiving signals in a low frequency (LF) band or an ultra-high frequency (UHF) band, for example. In this case, portable device 60 includes a structural element for transmitting/receiving the signals in the LF band or the UHF band.

Alternatively, the authentication using signals in the LF band or the UHF band may be authentication of another communication device that is carried by the user but is different from the portable device 60.

In the case where the authenticity of the portable device 60 (or the other communication device described above) is not confirmed through the authentication in step S108, or in the case where a ranging value obtained through the ranging in step S106 is over a designated value (NO in step S110), the communication system 1 may return to step S104.

On the other hand, in the case where the authenticity of the portable device 60 (or the other device described above) is confirmed through the authentication in step S108 and the ranging value obtained through the ranging in step S106 is the designated value or less (YES in step S110), the control device 20 turns off the wireless communication circuit 110 and turns on the capacitive sensor circuit 120 (S112).

With the above-described control, it is possible to reduce power consumption by turning on the capacitive sensor circuit 120 in the case where the user carrying the authenticated portable device 60 is within a designated distance from the vehicle 50.

The capacitive sensor circuit 120 turned on in step S112 then attempts to detect proximity of an object by continuously detecting a change in capacitance (S114).

In the case where the proximity of the object is detected by the capacitive sensor circuit 120 (YES in step S114), the control device 20 performs control in such a manner that the doors of the vehicle 50 is unlocked.

The example of the flow of operation of the communication system 1 according to the present embodiment has been described above. Note that, the flow of operation described above with reference to FIG. 4 is a mere example. The flow of operation of the communication system 1 according to the present embodiment is not limited thereto.

For example, as described above, the control by the wireless communication circuit 110 over the wireless communication conforming to the specific communication standard (steps S104 and 106) and the proximity detection of the object by the capacitive sensor circuit 102 (step S114) can be performed in parallel.

Alternatively, for example, by reversing the order shown in FIG. 4, the wireless communication circuit 110 may control the wireless communication conforming to the specific communication standard after the proximity of the object is detected by the capacitive sensor circuit 120.

In the case where the proximity detection of an object by the wireless communication circuit 110 triggers the start of the control by the wireless communication circuit 110 over the wireless communication conforming to the specific communication standard, there is no need to continue transmitting signals (or to continue waiting to receive signals), whereby it is expected to have an effect of further reducing power consumption.

On the other hand, as shown in FIG. 4, in the case where the authentication based on the wireless communication conforming to the specific communication standard triggers the start of the proximity detection of the object by the capacitive sensor circuit 120, the doors can be unlocked immediately after the proximity detection, whereby it is expected to have an effect of increasing responsiveness.

2. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

Further, in the present specification, the processes described using the flowchart are not necessarily executed in the order illustrated in the drawings. Some processing steps may be executed in an order different from the described order or in parallel.

What is claimed is:

1. A communication device, comprising:
   a wireless communication circuit configured to control wireless communication with a portable device in conformity with a specific communication standard;
   a capacitive sensor circuit configured to detect proximity of an object on a basis of a change in capacitance;
   an antenna configured to be used for both transmitting/receiving a wireless signal conforming to the specific communication standard and detecting the capacitance;
   a high-pass filter disposed between the wireless communication circuit and the antenna; and
   a low-pass filter disposed between the capacitive sensor circuit and the antenna,
   wherein the communication device is configured to be disposed in a gripping portion to be gripped by a user carrying the portable device, and
   the gripping portion includes a door handle provided on a vehicle.

2. The communication device according to claim 1, wherein the specific communication standard includes a standard for transmitting/receiving the wireless signal in a very high frequency band or higher frequency bands.

3. The communication device according to claim 1, wherein the specific communication standard includes a standard for transmitting/receiving the wireless signal in an ultra-wide band.

4. The communication device according to claim 1, wherein the low-pass filter includes a stub or a trap circuit.

5. The communication device according to claim 1, wherein the high-pass filter includes a capacitor.

6. The communication device according to claim 1, wherein the control by the wireless communication circuit over the wireless communication conforming to the specific communication standard and detection of the proximity of the object by the capacitive sensor circuit are performed in parallel.

7. The communication device according to claim 1, wherein the capacitive sensor circuit detects the proximity of the object after authenticity of the portable device is confirmed.

8. The communication device according to claim 1, wherein the wireless communication circuit controls the wireless communication conforming to the specific communication standard after the proximity of the object is detected by the capacitive sensor circuit.

9. A communication device, comprising:
   a wireless communication circuit configured to control wireless communication with a portable device in conformity with a specific communication standard;
   a capacitive sensor circuit configured to detect proximity of an object on a basis of a change in capacitance;
   an antenna configured to be used for both transmitting/receiving a wireless signal conforming to the specific communication standard and detecting the capacitance;
   a high-pass filter disposed between the wireless communication circuit and the antenna; and
   a low-pass filter disposed between the capacitive sensor circuit and the antenna,
   wherein the communication device is configured to be disposed in a gripping portion to be gripped by a user carrying the portable device, and
   the capacitive sensor circuit detects the proximity of the object after authenticity of the portable device is confirmed.

* * * * *